(12) United States Patent
Herzberg et al.

(10) Patent No.: US 12,372,116 B1
(45) Date of Patent: Jul. 29, 2025

(54) SYSTEM AND METHOD FOR LUBRICATING SURFACES OF PARTS

(71) Applicant: HONEYWELL FEDERAL MANUFACTURING & TECHNOLOGIES, LLC, Kansas City, MO (US)

(72) Inventors: Michael Richard Herzberg, Kansas City, MO (US); Brandon Kyle Leslie, Lee's Summit, MO (US); Joshua Michael Schnitzler, Lee's Summit, MO (US); Krishawn Michele Goodwin, Lee's Summit, MO (US)

(73) Assignee: Honeywell Federal Manufacturing & Technologies, LLC, Kansas City, MO (US)

( * ) Notice: Subject to any disclaimer, the term of this patent is extended or adjusted under 35 U.S.C. 154(b) by 579 days.

(21) Appl. No.: 16/805,966

(22) Filed: Mar. 2, 2020

(51) Int. Cl.
| | | |
|---|---|---|
| C10M 103/00 | (2006.01) | |
| B23K 26/00 | (2014.01) | |
| B23K 26/352 | (2014.01) | |
| C10M 103/02 | (2006.01) | |
| C10M 103/06 | (2006.01) | |
| C23C 4/11 | (2016.01) | |
| C23C 8/80 | (2006.01) | |
| F16C 33/04 | (2006.01) | |
| F16C 33/10 | (2006.01) | |

(52) U.S. Cl.
CPC ....... *F16C 33/1095* (2013.01); *C10M 103/00* (2013.01); *C10M 103/02* (2013.01); *C10M 103/06* (2013.01); *C23C 8/80* (2013.01); *F16C 33/043* (2013.01); *B23K 26/0093* (2013.01); *B23K 26/352* (2015.10); *C23C 4/11* (2016.01)

(58) Field of Classification Search
CPC ...... F16C 33/1095; F16C 33/043; C23C 8/80; C23C 4/11; B23K 26/352; B23K 26/0093; C10M 103/00; C10M 103/02; C10M 103/06
See application file for complete search history.

(56) References Cited

U.S. PATENT DOCUMENTS

| | | | |
|---|---|---|---|
| 3,157,529 A | 11/1964 | Sliney | |
| 4,227,756 A | 10/1980 | Bhushan | |
| 5,259,965 A * | 11/1993 | Kishi | ........................ C23C 8/80 |
| | | | 508/108 |
| 2002/0183209 A1 * | 12/2002 | Jee | ...................... C10M 103/00 |
| | | | 508/113 |

FOREIGN PATENT DOCUMENTS

| | | | |
|---|---|---|---|
| EP | 0614195 | 9/1994 | |
| EP | 0614195 A1 * | 9/1994 | ............... G21C 3/07 |

OTHER PUBLICATIONS

Office Action mailed Dec. 12, 2024 in related U.S. Appl. No. 17/986,263, 7 pages.

* cited by examiner

*Primary Examiner* — Daniel Pihulic
(74) *Attorney, Agent, or Firm* — Hovey Williams LLP

(57) ABSTRACT

A method for lubricating a surface of an object comprises generating and directing a laser beam to strike the surface of the object to create an oxide area on the surface struck by the laser beam; and applying a dry film lubricant to the oxide area.

21 Claims, 3 Drawing Sheets

SYSTEM AND METHOD FOR LUBRICATING SURFACES OF PARTS

STATEMENT REGARDING FEDERALLY-SPONSORED RESEARCH OR DEVELOPMENT

This invention was made with Government support under Contract No.: DE-NA00002839 awarded by the United States Department of Energy/National Nuclear Security Administration. The Government has certain rights in the invention.

FIELD OF THE INVENTION

Embodiments of the current invention relate to systems and methods for lubricating surfaces of parts that undergo frictional contact.

DESCRIPTION OF THE RELATED ART

Vehicle engines, military vehicle components, firearm components, satellites, earth orbiting structures, space return vehicles, and many other objects often experience extreme cold, extreme heat, high pressure, low pressure or vacuum, large temperature swings, or other harsh environments. Such objects are typically in frictional or mechanical contact with other objects and therefore require some type of friction-reducing lubricant. Traditional liquid lubricants used to reduce friction may not perform well or may even fail in harsh environments, which leads to overheating of the contact surfaces and premature wear.

SUMMARY OF THE INVENTION

Embodiments of the current invention solve the above-mentioned problems and provide an advance in the reduction of friction in objects for which traditional liquid lubricants underperform or fail.

One embodiment of the invention provides a method for lubricating a surface of an object. The method comprises the steps of: generating and directing a laser beam to strike the surface of the object to create an oxide area on the surface struck by the laser beam; and applying a dry film lubricant to the oxide area.

Another embodiment of the method comprises the steps of: generating and directing a laser beam to strike the surface of the object to create an oxide area on the surface struck by the laser beam, wherein the laser beam is generated to have a wavelength of approximately 1090 nanometers and to have an average power of approximately 30 watts; and applying a dry film lubricant including molybdenum disulfide to the oxide area.

Yet another embodiment of the current invention provides a system for lubricating a surface of an object. The system comprises a laser system and a dry film lubricant. The laser system is configured to generate and direct a laser beam to strike the surface of the object to create an oxide area on the surface struck by the laser beam. The dry film lubricant is configured to be applied to the oxide area.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the current invention are described in detail below with reference to the attached drawing figures, wherein.

Figure 1:
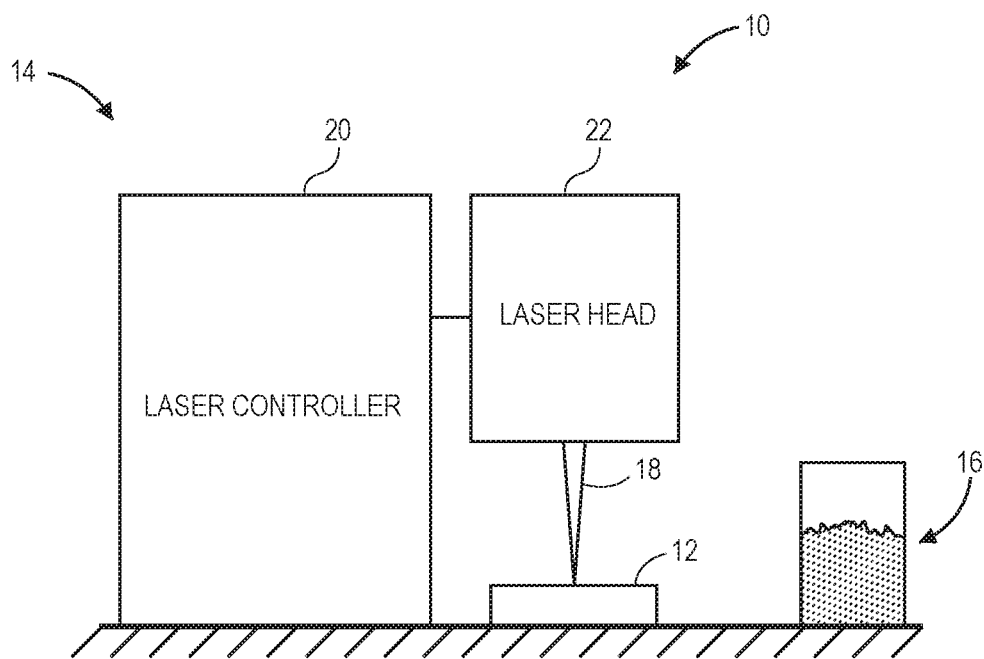
FIG. 1 is a schematic block diagram of the components forming a system, constructed in accordance with various embodiments of the current invention.

The drawing figures do not limit the current invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the technology references the accompanying drawings that illustrate specific embodiments in which the technology can be practiced. The embodiments are intended to describe aspects of the technology in sufficient detail to enable those skilled in the art to practice the technology. Other embodiments can be utilized and changes can be made without departing from the scope of the current invention. The following detailed description is, therefore, not to be taken in a limiting sense. The scope of the current invention is defined only by the appended claims, along with the full scope of equivalents to which such claims are entitled.

Referring to FIG. 1, a system 10, constructed in accordance with various embodiments of the current invention, for lubricating a surface of an object 12 broadly comprises a laser system 14 and a dry film lubricant 16. The object 12 may be any type of object that is utilized or implemented in an environment or setting wherein liquid lubricants do not perform well or even fail. The environments include extreme cold, extreme heat, high pressure, low pressure or vacuum, settings with large temperature swings, or combinations thereof. Therefore, the object 12 may include or be embodied by large, small vehicle engines, engine components or combinations thereof, military vehicle components, firearm components, satellites, earth orbiting structures, space return vehicles, or the like. The surface of the object 12 may be any surface that encounters frictional or mechanical contact with other surfaces or objects.

The laser system 14 generally strikes, impinges, or contacts at least a surface of the object 12 to produce a layer of oxide on the surface. The laser system 14 is configured to generate a laser beam 18 and may include or be embodied by a fiber laser. An exemplary laser system 14 includes a model MD-F3100 fiber laser from Keyence Corporation of America in Itasca, Ill., and comprises a laser controller 20 and a laser head 22. The laser system 14 may alternatively be embodied by lasers such as yttrium aluminum garnet (YaG) lasers, yttrium orthovanadate (YVO4) lasers, ultraviolet (UV) lasers, CO2 lasers, or the like. The laser system 14 may include a laser beam source which generates the laser beam 18. In some embodiments, the laser beam source may portable or even handheld. In other embodiments, the laser system 14 may further include a housing or structure with a stage or platform on which the object 12 to be lubricated may be placed. The laser system 14 may also include electrically and/or mechanically controlled optics to guide the laser beam 18, a precision motion control system for the stage, or a combination of both. The laser beam 18 of the laser system 14 may be continuous wave or may be pulsed. In addition, the laser system 14 may include electronic and optical components that allow for control of the energy or power of the laser beam 18, the pulse time period of the laser beam 18, the pulse repetition rate of the laser beam 18, and the like. Exemplary specifications for the laser system 14 include a wavelength in the infrared spectrum ranging from approximately 700 nanometers (nm) to approximately 1400 nm with a preferred wavelength of approximately 1090 nm, an average power ranging from approximately 5 Watts (W) to approximately 30 W, a laser power of approximately 80%, a frequency of approximately 60 kilohertz (kHz), a scan speed ranging from approximately 400 millimeters per second (mm/s) to approximately 800 mm/s, and a repetition ranging from approximately 4 times to approximately 5 times.

The laser system 14 may generate and control the laser beam 18 to strike, impinge, or contact an entire area (all) of one or more surfaces of the object 12, one or more portions of one or more surfaces of the object 12, or a pattern on one or more portions of one or more surfaces of the object 12. For example, a pattern of parallel lines, a checkerboard pattern, a dot pattern, or the like may be formed on one or more portions of one or more surfaces of the object 12. In the areas struck, impinged, or contacted by the laser beam 18, a layer of oxide results, grows, or is produced. A thickness of the oxide layer ranges from approximately 40 nm to approximately 800 nm, with a thickness ranging from approximately 200 nm to approximately 400 nm resulting in a purple or black coloration on the surface where friction occurs. In some embodiments, the oxide layer may have a uniform thickness over the area on which it is created. For example, if the oxide layer is created over a square area on a surface of the object 12, then the oxide layer present on all of the square area has the same thickness. In other embodiments, the oxide layer may have a non-uniform thickness over the area on which it is created. For example, if the oxide layer is created over a square area on a surface of the object 12, then the oxide layer may have a first thickness at a first edge of the square and a second thickness at a second edge of the square, wherein the thickness has a gradient that increases linearly, or non-linearly, from the first edge to the second edge. Alternatively, the thickness of the oxide layer may vary according to other criteria, such as a mathematical function. Furthermore, the thickness of the oxide layer may be chosen, or determined, or may vary, according to the anticipated wear, or frictional contact, for each area. For example, if it is known that a first area on the surface of the object 12 is anticipated to have greater frictional contact than a second area on the surface, then the oxide thickness of the first area may be greater than the oxide thickness of the second area.

The dry film lubricant 16 may include powder forms of molybdenum disulfide, tungsten disulfide, graphite, or the like, or combinations thereof. The dry film lubricant 16 may be applied or delivered to the surface of the object 12 through a supply line wherein the dry film lubricant 16 is propelled by compressed nitrogen gas. Typically, the dry film lubricant 16 is applied to those areas of the surface of the object 12 that have been struck, impinged, or contacted by the laser beam 18.

Figure 2:
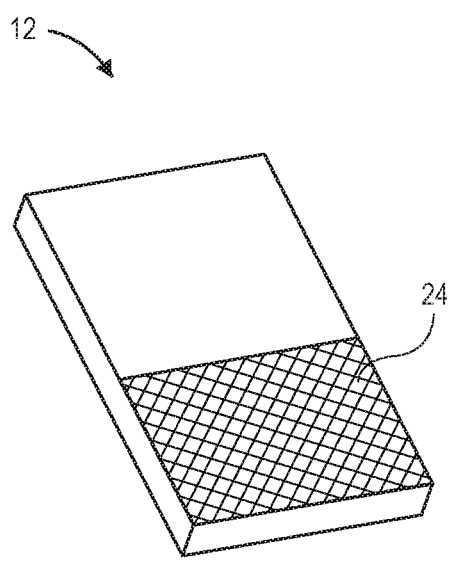
FIG. 2 is a perspective view of an object to be lubricated after having been struck with a laser beam to create an oxide area.
Figure 3:
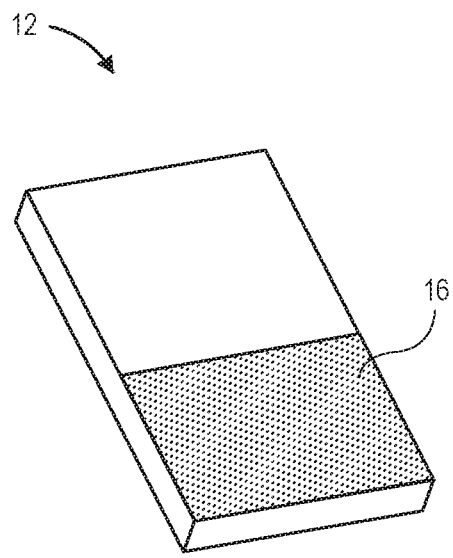
FIG. 3 is a perspective view of the object after having a dry lubricant applied to the oxide area.

To lubricate the surface of the object 12, the object 12 may be cleaned by placing it in an ultrasonic bath of a detergent solution or a mild solvent. Afterward, the object 12 is then placed on the stage of the laser system 14 or generally positioned to be struck, impinged, or contacted by the laser beam 18, as shown in FIG. 1. The object 12, while being struck, impinged, or contacted by the laser beam 18, should be in the presence of oxygen. The concentration levels of oxygen in a normal atmosphere are sufficient, although the object 12 may be struck, impinged, or contacted by the laser beam 18 in a controlled environment. With the object in place in an oxygen-present environment, the laser system 14 generates the laser beam 18 to strike, impinge, or contact the desired areas of the surfaces of the object 12, which heats the surfaces. The laser system 14 may control the laser beam 18 to strike, impinge, or contact all or part of any of the surfaces of the object 12 either in a continuous, or near-continuous, fashion or in a pattern. As a result of the laser beam 18 heating the surface of the object 12, oxide grows in the struck, impinged, or contacted areas—creating at least one oxide area 24, which is typically visible, on the surface, as shown in FIG. 2. After the laser beam 18 has struck, impinged, or contacted all of the desired areas, the object 12 is removed from the laser system 14 and the dry film lubricant 16 is applied to the oxide areas 24, as shown in FIG. 3. In various embodiments, the object 12 may be cleaned again by placing it in an ultrasonic bath of a detergent solution or a mild solvent before the dry film lubricant 16 is applied. The dry film lubricant 16 may be applied through a supply line wherein the dry film lubricant 16 is propelled by compressed nitrogen gas so that the dry film lubricant particles impinge the surface of the oxide areas 24 of the object 12. The dry film lubricant 16 may create a coating on the oxide areas 24. Alternatively, the dry film lubricant 16 may be applied to the surface of the oxide areas 24 of the object 12 using a physical vapor deposition (PVD) process. Or, the dry film lubricant 16 may be applied by hand burnishing.

Figure 4:
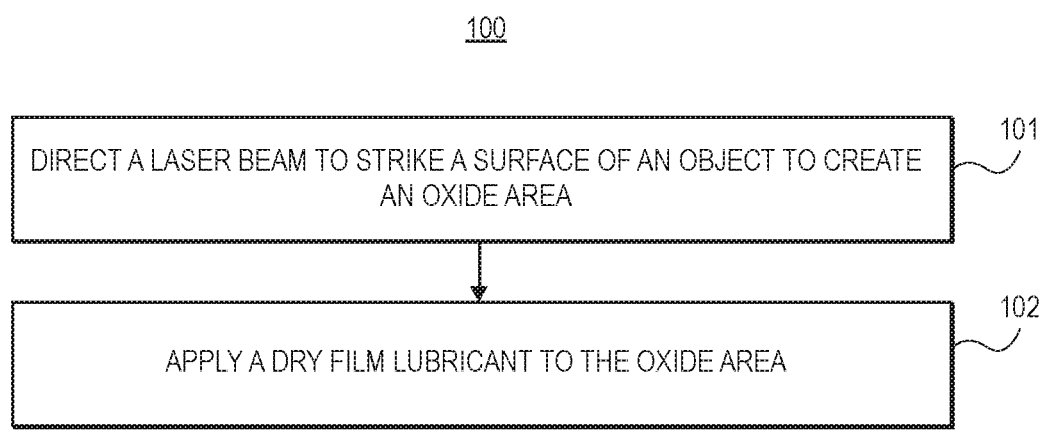
FIG. 4 is a flow diagram of at least a portion of the steps of a method for lubricating a surface of an object.

FIG. 4 depicts a listing of at least a portion of the steps of an exemplary computer-implemented method 100 for lubricating a surface of an object 12. The steps may be performed in the order shown in FIG. 4, or they may be performed in a different order. Furthermore, some steps may be performed concurrently as opposed to sequentially. In addition, some steps may be optional or may not be performed.

Referring to step 101, a laser beam 18 is generated and directed to the strike the surface of the object 12, as shown in FIG. 1. The laser beam 18 is generated and directed to strike, impinge, or contact an entire area (all) of one or more surfaces of the object 12, one or more portions of one or more surfaces of the object 12, or a pattern on one or more portions of one or more surfaces of the object 12, which heats the surfaces. The laser beam 18 is generated and directed to strike, impinge, or contact the object 12 in the presence of oxygen. As a result of the laser beam 18 heating the surface of the object 12, oxide grows in the struck, impinged, or contacted areas and creates one or more oxide areas 24, as shown in FIG. 2. In various embodiments, before the laser beam 18 is directed at the object 12, the object 12 may be cleaned by placing it in an ultrasonic bath of a detergent solution or a mild solvent. Furthermore, the object 12 may be cleaned in the same manner after the laser beam 18 is directed at the object 12.

Referring to step 102, a dry film lubricant 16 is applied to the oxide areas 24 of the object 12, as shown in FIG. 3. The dry film lubricant 16 may include powder forms of molybdenum disulfide, tungsten disulfide, graphite, or the like, or combinations thereof. The dry film lubricant 16 may be applied or delivered specifically to the oxide areas 24 of the object 12 through a supply line wherein the dry film lubricant 16 is propelled by compressed nitrogen gas. The dry film lubricant 16 may create a coating on the oxide areas 24. Alternatively, the dry film lubricant 16 may be applied to the surface of the oxide areas 24 of the object 12 using a physical vapor deposition (PVD) process. Or, the dry film lubricant 16 may be applied by hand burnishing.

Figure 5:
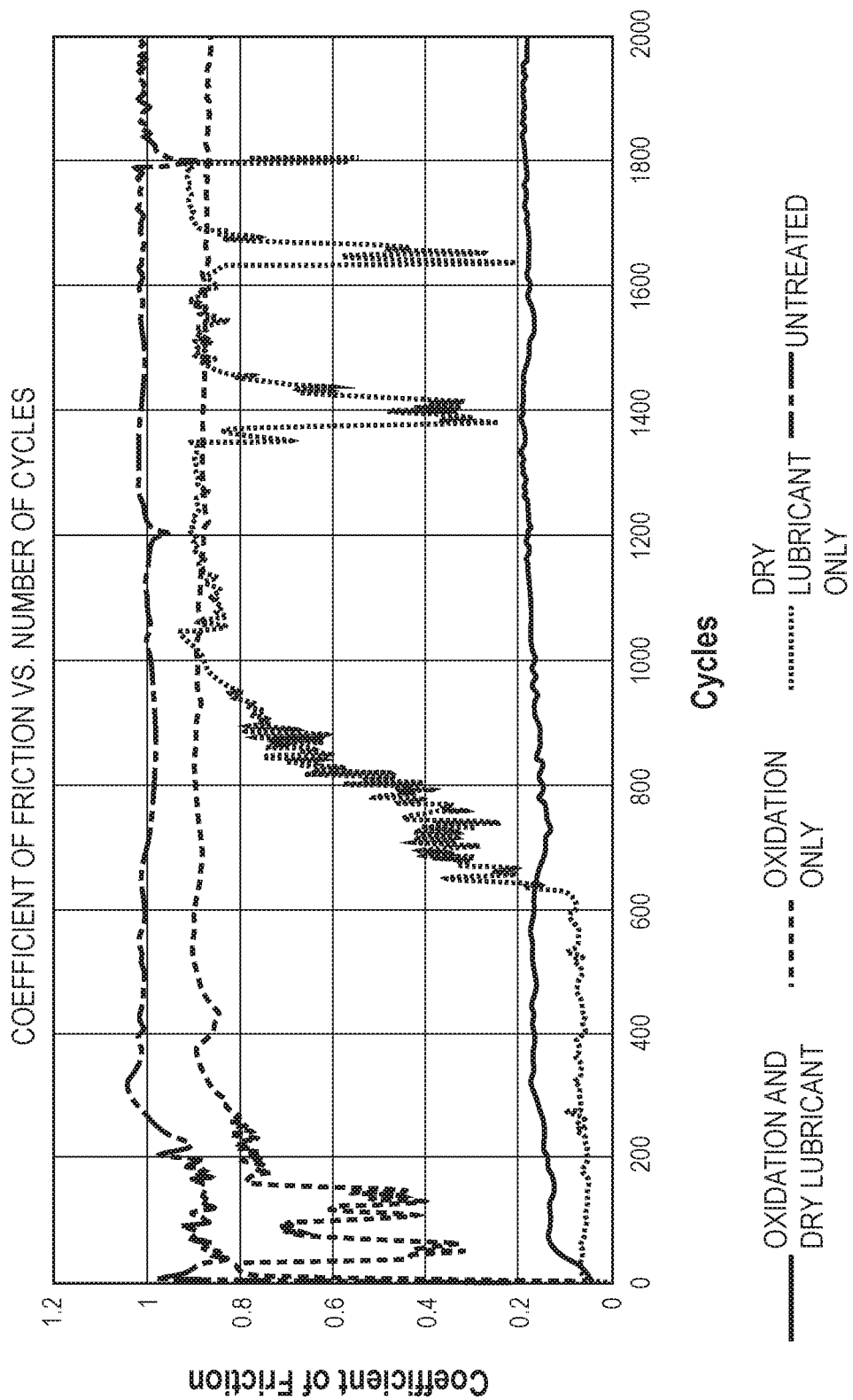
FIG. 5 is a plot of a coefficient of friction vs. a number of cycles for a plurality of test objects, at least one of which has been lubricated using embodiments of the current invention.

The method 100 was implemented using the system 10 to test its effectiveness at lubricating a surface of an object 12 which would be frictionally contacted thousands of times. Four discs formed from a metal, such as stainless steel, were utilized in the test. At least one surface of a first disc was treated using the method 100, including forming the oxide area 24 which was then coated with the dry film lubricant 16. At least one surface of a second disc had only the laser beam 18 applied which created the oxide area 24. At least one surface of a third disc had only the dry film lubricant 16 applied. A fourth disc was untreated. During the test, each disc was spun about its center and a pin with a metallic, spherical ball tip was pressed against the treated surfaces, which created a circular track on the disc. A coefficient of friction between the ball tip and the surface of each disc was measured for each cycle of the test, wherein one cycle included one revolution of the disc. A plot of the measured coefficient of friction vs. the number of cycles for each disc is shown in FIG. 5. As can be seen from the plot, the disc which was treated using the method 100 maintained a coefficient of friction of less than 0.2 throughout 2,000 test cycles. Generally, a lower coefficient of friction is desirable in this situation and is necessary to reduce component wear in general. The coefficient of friction of the disc treated using the method 100 was 4-5 times less than the coefficients of friction of the discs which were untreated, had a laser-generated oxide area 24 only, or received the dry film lubricant 16 only. Thus, the system 10 and the method 100 of the current invention provide an advance in the reduction of friction between components that contact one another a large number of times.

Furthermore, the inventors have discovered that the thickness of the oxide layer corresponds to, is proportional to, or varies with, the amount of wear reduction provided by the system 10 and the method 100. That is, a greater oxide thickness may provide a greater reduction in the amount of wear experienced by the surface of the part 12 undergoing repeated frictional contact, while a smaller oxide thickness may provide a smaller reduction in the amount of wear.

In addition, the inventors have discovered that the perceived color of the surface of the part 12 undergoing repeated frictional contact varies according to the thickness of the oxide layer. For example, a relatively thick oxide layer appears to have a different color compared to a color of a relatively thin oxide layer. Also, the thickness of the oxide layer provides an indication of the amount of wear that the surface of the part 12 has already experienced. Generally, surfaces with relatively thinner oxide layers have experienced more wear than surfaces with relatively thicker oxide layers. Therefore, the perceived color of the surface of the part undergoing repeated frictional contact is an indication of the wear that the surface has experienced as a result of the repeated contact. The surface that has experienced relatively more wear appears to have a different color compared to a color of the surface that has experienced relatively less wear. Accordingly, based on the perceived color of the surface of the part 12, adjustments can be made to either the part 12 or the environment in which the part 12 operates. For example, if the color of the surface of the part 12 indicates increased wear, then the part 12 may be processed again using the system 10 and/or method 100 of the current invention to reapply the oxide layer and dry film lubricant 16. Additionally, or alternatively, the position, the orientation, the pressure applied or forces involved with either the part 12 or the component it contacts may be adjusted so as to reduce the frictional contact.

ADDITIONAL CONSIDERATIONS

Throughout this specification, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current invention can include a variety of combinations and/or integrations of the embodiments described herein.

Although the present application sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processing element, may be implemented as special purpose or as general purpose. For example, the processing element may comprise dedicated circuitry or logic that is permanently configured, such as an application-specific integrated circuit (ASIC), or indefinitely configured, such as an FPGA, to perform certain operations. The processing element may also comprise programmable logic or circuitry (e.g., as encompassed within a general-purpose processor or other programmable processor) that is temporarily configured by software to perform certain operations. It will be appreciated that the decision to implement the processing element as special purpose, in dedicated and permanently configured circuitry, or as general purpose (e.g., configured by software) may be driven by cost and time considerations.

Accordingly, the term "processing element" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processing element is temporarily configured (e.g., programmed), each of the processing elements need not be configured or instantiated at any one instance in time. For example, where the processing element comprises a general-purpose processor configured using software, the general-purpose processor may be configured as respective different processing elements at different times. Software may accordingly configure the processing element to constitute a particular hardware configuration at one instance of time and to constitute a different hardware configuration at a different instance of time.

Computer hardware components, such as communication elements, memory elements, processing elements, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processing elements that are temporarily configured (e.g., by software) or permanently configured to perform the relevant operations. Whether temporarily or permanently configured, such processing elements may constitute processing element-implemented modules that operate to perform one or more operations or functions. The modules referred to herein may, in some example embodiments, comprise processing element-implemented modules.

Similarly, the methods or routines described herein may be at least partially processing element-implemented. For example, at least some of the operations of a method may be performed by one or more processing elements or processing element-implemented hardware modules. The performance of certain of the operations may be distributed among the one or more processing elements, not only residing within a single machine, but deployed across a number of machines. In some example embodiments, the processing elements may be located in a single location (e.g., within a home environment, an office environment or as a server farm), while in other embodiments the processing elements may be distributed across a number of locations.

Unless specifically stated otherwise, discussions herein using words such as "processing," "computing," "calculating," "determining," "presenting," "displaying," or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112(f) unless traditional means-plus-function language is expressly recited, such as "means for" or "step for" language being explicitly recited in the claim(s).

Although the technology has been described with reference to the embodiments illustrated in the attached drawing figures, it is noted that equivalents may be employed and substitutions made herein without departing from the scope of the technology as recited in the claims.

Having thus described various embodiments of the technology, what is claimed as new and desired to be protected by Letters Patent includes the following:

1. A method for lubricating a surface of an object, the method comprising:
   generating and directing a laser beam to strike the surface of the object to create an oxide area on the surface struck by the laser beam; and
   applying a dry film lubricant in a powder form to the oxide area.

2. The method of claim 1, wherein directing the laser beam includes directing the laser beam to strike selective areas on the surface of the object.

3. The method of claim 1, wherein directing the laser beam includes directing the laser beam to strike a pattern on the surface of the object.

4. The method of claim 1, wherein the laser beam is generated to have a wavelength ranging from approximately 700 nanometers to approximately 1400 nanometers.

5. The method of claim 1, wherein the laser beam is generated to have an average power ranging from approximately 5 Watts to approximately 30 watts.

6. The method of claim 1, wherein the dry film lubricant includes molybdenum disulfide.

7. The method of claim 1, wherein the dry film lubricant includes tungsten disulfide.

8. The method of claim 1, wherein the dry film lubricant includes graphite.

9. A method for lubricating a surface of an object, the method comprising:
   generating and directing a laser beam to strike the surface of the object to create an oxide area on the surface struck by the laser beam, wherein the laser beam is generated to have a wavelength ranging from approximately 700 nanometers to approximately 1400 nanometers and to have an average power ranging from approximately 5 Watts to approximately 30 watts; and
   applying a dry film lubricant including molybdenum disulfide in a powder form to the oxide area.

10. The method of claim 9, wherein directing the laser beam includes directing the laser beam to strike selective areas on the surface of the object.

11. The method of claim 9, wherein directing the laser beam includes directing the laser beam to strike a pattern on the surface of the object.

12. A system for lubricating a surface of an object, the system comprising:
   a laser system configured to generate and direct a laser beam to strike the surface of the object to create an oxide area on the surface struck by the laser beam; and
   a dry film lubricant in a powder form configured to be applied to the oxide area.

13. The system of claim 12, wherein the laser system directs the laser beam to strike selective areas on the surface of the object.

14. The system of claim 12, wherein the laser system directs the laser beam to strike a pattern on the surface of the object.

15. The system of claim 12, wherein the laser system generates the laser beam to have a wavelength ranging from approximately 700 nanometers to approximately 1400 nanometers.

16. The system of claim 12, wherein the laser system generates the laser beam to have an average power ranging from approximately 5 Watts to approximately 30 watts.

17. The system of claim 12, wherein the dry film lubricant includes molybdenum disulfide.

18. The system of claim 12, wherein the dry film lubricant includes tungsten disulfide.

19. The system of claim 12, wherein the dry film lubricant includes graphite.

20. The system of claim 12, wherein the laser system generates the laser beam to have a wavelength ranging from approximately 700 nanometers to approximately 1400 nanometers and to have an average power ranging from approximately 5 Watts to approximately 30 watts.

21. The method of claim 1, wherein the dry film lubricant is applied to the oxide area through a supply line propelled by a compressed gas.

* * * * *